United States Patent
Chu

(10) Patent No.: US 10,191,533 B2
(45) Date of Patent: Jan. 29, 2019

(54) METHOD OF ENABLING SLEEP MODE, MEMORY CONTROL CIRCUIT UNIT AND STORAGE APPARATUS

(71) Applicant: PHISON ELECTRONICS CORP., Miaoli (TW)

(72) Inventor: Chien-Hua Chu, Hsinchu County (TW)

(73) Assignee: PHISON ELECTRONICS CORP., Miaoli (TW)

(*) Notice: Subject to any disclaimer, the term of this patent is extended or adjusted under 35 U.S.C. 154(b) by 450 days.

(21) Appl. No.: 14/698,870

(22) Filed: Apr. 29, 2015

(65) Prior Publication Data
US 2016/0274648 A1    Sep. 22, 2016

(30) Foreign Application Priority Data

Mar. 19, 2015   (TW) .............................. 104108796 A

(51) Int. Cl.
G06F 1/32    (2006.01)

(52) U.S. Cl.
CPC .......... G06F 1/3268 (2013.01); G06F 1/3221 (2013.01)

(58) Field of Classification Search
CPC ............................ G06F 1/3221; G06F 1/3225
See application file for complete search history.

(56) References Cited

U.S. PATENT DOCUMENTS

| | | | | |
|---|---|---|---|---|
| 9,377,846 B2 * | 6/2016 | Cheong | ................ | G06F 1/3256 |
| 2002/0186603 A1 * | 12/2002 | Kyung | ................... | G11C 29/46 365/201 |
| 2004/0060013 A1 * | 3/2004 | Isom, III | ................ | G11C 29/46 716/100 |
| 2009/0006876 A1 * | 1/2009 | Fukatani | ................ | G06F 3/0625 713/320 |
| 2012/0191996 A1 * | 7/2012 | Cheong | ................. | G06F 1/3256 713/320 |
| 2014/0258745 A1 * | 9/2014 | Ehrlich | ................. | G06F 1/3268 713/320 |
| 2016/0181801 A1 * | 6/2016 | Shimizu | .................... | G06F 3/06 307/19 |

OTHER PUBLICATIONS

Intel Corporation and SanDisk Corporation, Serial ATA Device Sleep (DevSleep) and Runtime D3 (RTD3), Dec. 2011, www.serialata.org, p. 7.*

* cited by examiner

*Primary Examiner* — Robert A Cassity
*Assistant Examiner* — Gary Collins
(74) *Attorney, Agent, or Firm* — JCIPRNET

(57) ABSTRACT

A sleep mode enabling method for a memory storage apparatus is provided. The method includes: setting a sleep pin connecting flag as a first value if a potential signal on a device sleep signal pin is at a second logic level opposite to an initial first logic level; setting a device sleep function flag as the first value in response to a device sleep function enabling command received from a host system; and enabling a device sleep function of the memory storage apparatus if the device sleep function enabling command is received and the device sleep function flag is set as the first value.

21 Claims, 6 Drawing Sheets

METHOD OF ENABLING SLEEP MODE, MEMORY CONTROL CIRCUIT UNIT AND STORAGE APPARATUS

CROSS-REFERENCE TO RELATED APPLICATION

This application claims the priority benefit of Taiwan application serial no. 104108796, filed on Mar. 19, 2015. The entirety of the above-mentioned patent application is hereby incorporated by reference herein and made a part of this specification.

BACKGROUND

Technical Field

The present invention relates to a method of enabling a memory storage apparatus to enter a sleep mode, and a memory control circuit unit and a memory storage apparatus using the method.

Description of Related Art

In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer. In addition, as consciousness of environmental protection raises, green technology has become a target that electronic manufacturers is trying to achieve. The solid-state drive has been designed to support a device sleep signal protocol in order to avoid the disk driver not being used by users from consuming power. However, a device sleep signal is transmitted through one of pins in a power connection interface and in a case where the device sleep signal protocol is not supported by the power connection of host system, when the host system is power on, the solid-state drive may directly enter a sleep mode without operating due to misjudgments of signals on the power connection interface.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a method of enabling a sleep mode, a memory control circuit unit and a memory storage apparatus, which are capable of effectively avoiding the sleep mode being entered by mistakes.

According to an exemplary embodiment of the present invention, a sleep mode enabling method for a memory storage apparatus is provided, wherein a potential signal on a device sleep signal pin of the memory storage apparatus is initially at a first logic level. The sleep mode enabling method includes: setting a sleep pin connecting flag as a first value if the potential signal on the device sleep signal pin of the memory storage apparatus is at a second logic level opposite to the first logic level; and enabling a device sleep function of the memory storage apparatus if a device sleep function enabling command is received and the sleep pin connecting flag is set as the first value.

According to an exemplary embodiment of the invention, a memory control circuit unit for controlling a memory storage apparatus is provided, wherein a potential signal on a device sleep signal pin of the memory storage apparatus is initially at a first logic level. The memory control circuit unit includes a host interface, a memory interface, a buffer memory unit and a memory management circuit. The host interface is configured to electrically connect a host system. The memory interface is configured to couple to a rewritable non-volatile memory module. The buffer storage unit is configured to record a sleep pin connecting flag. The memory management circuit is coupled to the memory interface, the host interface and the buffer memory unit, and configured to set the sleep pin connecting flag as a first value if the potential signal on the device sleep signal pin of the memory storage apparatus is at a second logic level opposite to the first logic level. Further, the memory management circuit is further configured to enable a device sleep function if a device sleep function enabling command is received and the sleep pin connecting flag is set as the first value.

A memory storage apparatus is provided according to an exemplary embodiment of the invention, which includes a connection interface unit, a rewritable non-volatile memory module and a memory control circuit unit. The connection interface unit is configured to couple to a host system, and includes a data connection interface and a power connection interface. The rewritable non-volatile memory module includes a plurality of physical erasing units. The memory control circuit unit is coupled to the connection interface unit and the rewritable non-volatile memory module, and includes a buffer storage unit. The buffer storage unit records a sleep pin connecting flag. The memory control circuit unit is configured to set the sleep pin connecting flag as a first value if a potential signal on a device sleep signal pin is at a second logic level opposite to a first logic level. Further, the memory control circuit unit is further configured to enable a device sleep function if a device sleep function enabling command is received and the device sleep function flag is set as the first value.

Based on above, the method of enabling a sleep mode, the memory control circuit unit and the memory storage apparatus according to the exemplary embodiments of the present invention are capable enabling the device sleep function only when the device sleep signal pin is correctly electrically connected to the pins supporting the device sleep signal protocol, so as to effectively avoid the sleep mode being entered by mistakes.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
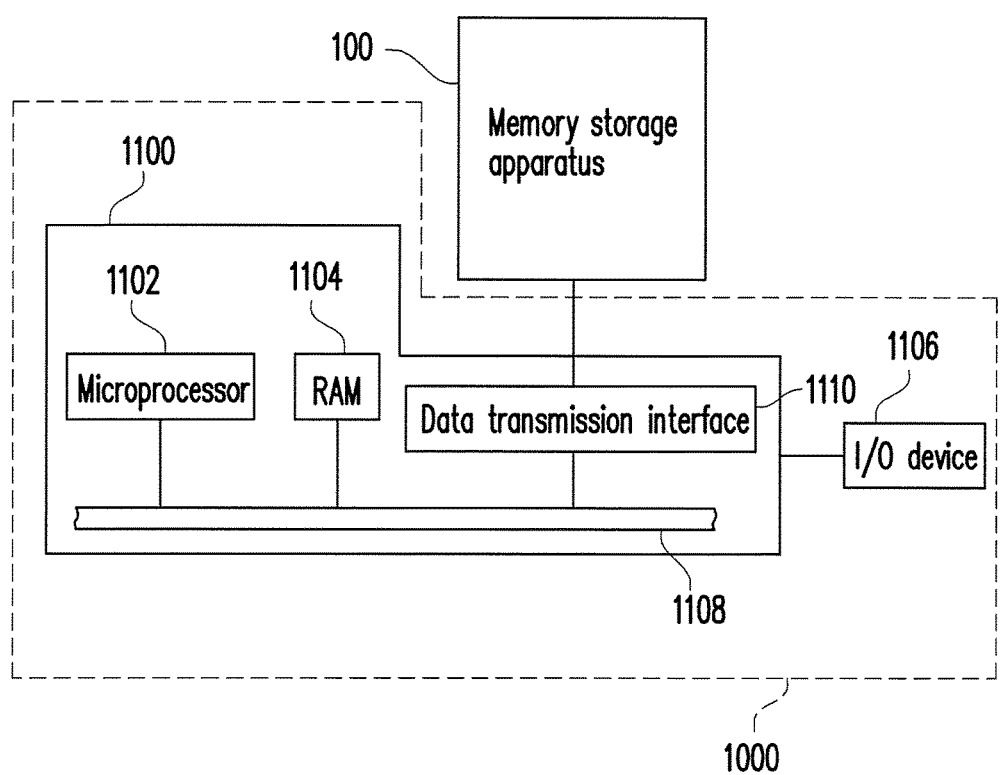
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured together with a host system so that the host system may write data to or read data from the memory storage apparatus.

FIG. 1 illustrates a host system and a memory storage apparatus according to an exemplary embodiment.

Figure 2:
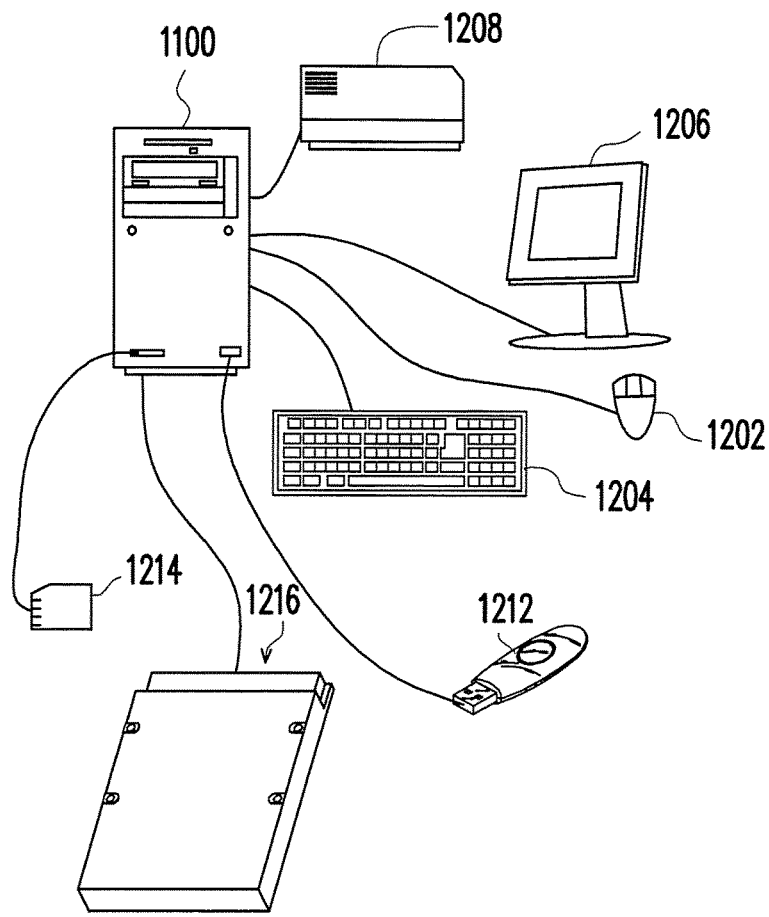
FIG. 2 is a schematic diagram illustrating a computer, an input/output device, and a memory storage apparatus according to an exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the present embodiment of the invention, the memory storage apparatus 100 is coupled to other devices of the host system 1000 through the data transmission interface 1110. By using the microprocessor 1102, the random access memory (RAM) 1104 and the Input/Output (I/O) device 1106, data may be written into the memory storage apparatus 100 or may be read from the memory storage apparatus 100. For example, the memory storage apparatus 100 may be a rewritable non-volatile memory storage apparatus such as a flash drive 1212, a memory card 1214, or a solid state drive (SSD) 1216 as shown in FIG. 2.

Figure 3:
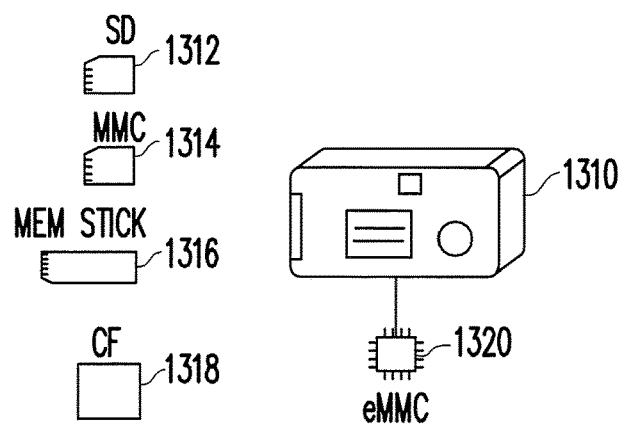
FIG. 3 is a schematic diagram illustrating a host system and a memory storage apparatus according to an exemplary embodiment.

Generally, the host system 1000 may substantially be any system capable of cooperating with the memory storage apparatus 100 for storing data. Even though the host system 1000 is illustrated as a computer system in the present exemplary embodiment, in another exemplary embodiment of the present invention, the host system 1000 may be a digital camera, a video camera, a telecommunication device, an audio player, or a video player. For example, when the host system is a digital camera (video camera) 1310, the rewritable non-volatile memory storage apparatus may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
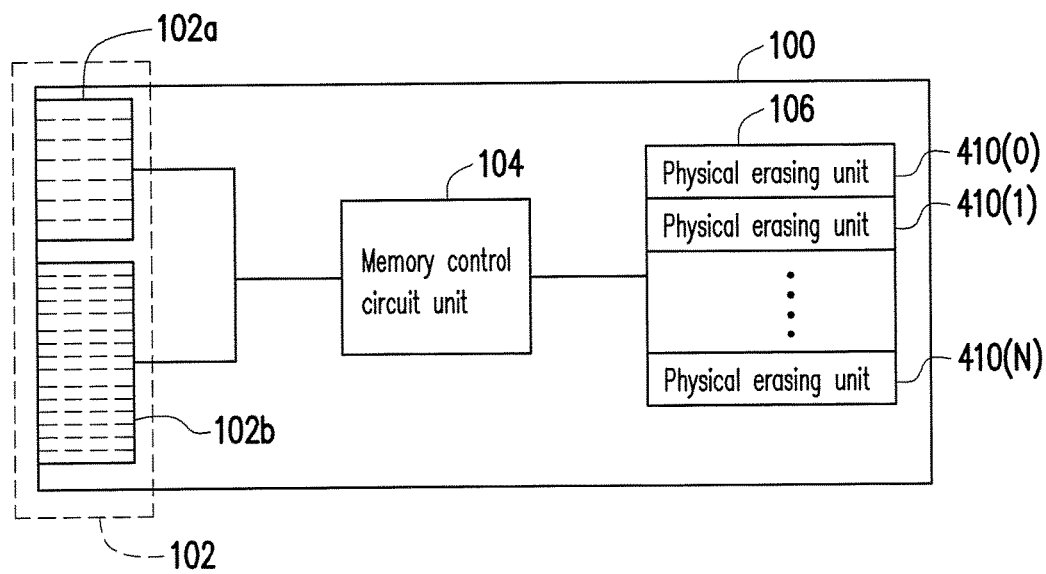
FIG. 4 is a schematic block diagram illustrating the memory storage apparatus according to an exemplary embodiment.

FIG. 4 is a schematic block diagram illustrating the memory storage apparatus according to an exemplary embodiment.

Referring to FIG. 4, the memory storage apparatus 100 includes a connection interface unit 102, a memory control circuit unit 104 and a rewritable non-volatile memory module 106.

The connection interface unit 102 includes a data connection interface 102a and a power connection interface 102b. The data connection interface 102a is configured to connect to a bus connection interface of the host system 1000, and the power connection interface 102b is configured to connect to a power supply connection interface of the host system 1000. In the present exemplary embodiment, the data connection interface 102a is capable of receiving, for example, at least one set of differential signals, and the power connection interface 102b includes a device sleep signal pin configured to support a device sleep signal protocol.

More specifically, the host system 1000 that supports the device sleep signal protocol is capable of controlling a signal output pin coupled to the device sleep signal pin in the power supply connection interface for instructing the memory storage apparatus 100 to start entering a sleep mode. For instance, if the host system 1000 controls a potential signal on the signal output pin coupled to the device sleep signal pin in the power supply connection interface to be at a first logic level, a potential signal on the device sleep signal pin of the power connection interface 102b may also be at the first logic level, such that the memory storage apparatus 100 may start to enter the sleep mode; and if the host system 1000 controls the potential signal on the signal output pin coupled to the device sleep signal pin in the power supply connection interface to be at a second logic level, the potential signal on the device sleep signal pin of the power connection interface may also be at the second logic level, such that the memory storage apparatus 100 may operate normally. Herein, the first logic level and the second logic level may be set according to different designs. For instance, in the present exemplary embodiment, the first logic level is a high logic level, and the second logic level is a low logic level which is opposite to the first logic level. In the present exemplary embodiment, the high logic level refers to: when a voltage level is higher than a predetermined value, that voltage level is determined as the high logic level. On the other hand, the low logic level refers to: when a voltage level is lower than a predetermined value, that voltage level is determined as the low logic level.

In the present exemplary embodiment, the connection interface unit 102 is compatible with a serial advanced technology attachment (SATA) standard. However, the invention is not limited thereto, and the connection interface unit 102 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or emplaced outside of a chip containing the memory control circuit unit.

The memory control circuit unit 104 is configured to execute a plurality of logic gates or control commands which are implemented in a hardware form or in a firmware form, so as to execute operations of writing, reading or erasing data in the rewritable non-volatile memory storage module 106 according to the commands of the host system 1000.

The rewritable non-volatile memory module 106 is coupled to the memory control circuit unit 104 and configured to store data written from the host system 1000. The rewritable non-volatile memory storage module 106 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 4 physical access addresses, and the size of each physical access address is 512 bytes. However, in other exemplary embodiments, the data bit area may also include more or less of the physical access addresses, and an amount and a size of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 106 is a Multi Level Cell (MLC) NAND flash memory module (i.e., a flash memory module capable of storing two bits of data in one memory cell). However, the present invention is not limited thereto. The rewritable non-volatile memory module 106 may also be a Single Level Cell (SLC) NAND flash memory module, (i.e., a flash memory module capable of storing one bit of data in one memory cell), a Trinary Level Cell (TLC) NAND flash memory module (i.e., a flash memory module capable of storing three bits of data in one memory cell), other flash memory modules or any memory module having the same features.

Figure 5:
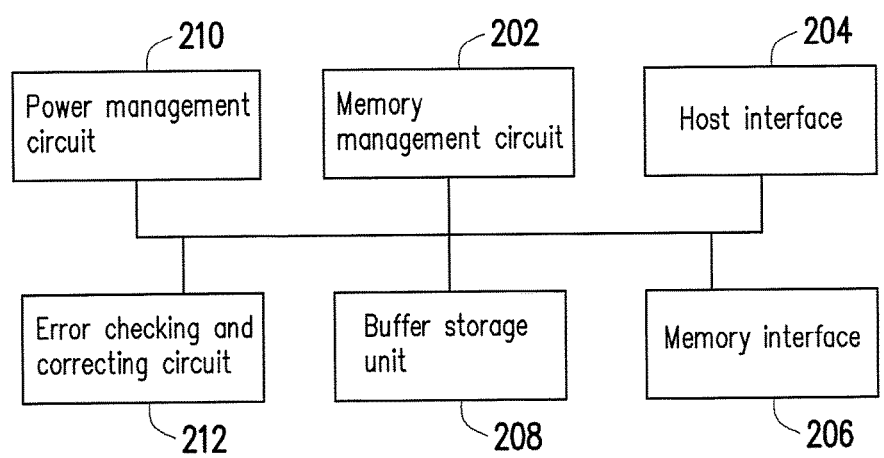
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204, a memory interface 206 and a buffer storage unit 208.

The memory management circuit 202 is configured to control overall operations of the memory control circuit unit 104. Specifically, the memory management circuit 202 has a plurality of control commands. During operations of the memory storage apparatus 100, the control commands are executed to execute various operations such as writing, reading and erasing data.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. When the memory storage apparatus 100 operates, the control commands are executed by the microprocessor to perform operations of writing, reading or erasing data.

In another exemplary embodiment, the control commands of the memory management circuit 202 may also be stored as program codes in a specific area (e.g., the system area in a memory exclusively used for storing system data) of the rewritable non-volatile memory module 106. In addition, the memory management circuit 202 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 106 to the random access memory of the memory management circuit 202 when the memory control circuit unit 104 is enabled. Thereafter, the control commands are executed by the microprocessor unit to execute operations of writing, reading or erasing data.

Further, in another exemplary embodiment, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 106; the memory writing circuit is configured to issue a write command to the rewritable non-volatile memory module 106 in order to write data into the rewritable non-volatile memory module 106; the memory reading circuit is configured to issue a read command to the rewritable non-volatile memory module 106 in order to read data from the rewritable non-volatile memory module 106; the memory erasing circuit is configured to issue an erase command to the rewritable non-volatile memory module 106 in order to erase data from the rewritable non-volatile memory module 106; the data processing circuit is configured to process both the data to be written to the rewritable non-volatile memory module 106 and the data to be read from the rewritable non-volatile memory module 106.

The host interface 204 is coupled to the memory management circuit 202 and configured to couple to the connection interface unit 102, so as to receive and identify commands and data sent from the host system 1000. In other words, the commands and the data sent from the host system 1000 are passed to the memory management circuit 202 through the host interface 204. In the present exemplary embodiment, the host interface 204 is compatible with the SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

The buffer storage unit 208 is coupled to the memory management circuit 202 and configured to temporarily store data and commands from the host system 1000 or data from the rewritable non-volatile memory module 106.

In an exemplary embodiment, the memory control circuit unit 104 further includes a power management circuit 210 and an error checking and correcting circuit 212.

The power management unit 210 is coupled to the memory management circuit 202 and configured to control a power of the memory storage apparatus 100.

The error checking and correcting circuit 212 is coupled to the memory management circuit 202 and configured to execute an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Subsequently, when the memory management circuit 202 reads the data from the rewritable non-volatile memory module 106, the error checking and correcting code corresponding to the data is also read, and the error checking and correcting circuit 212 may execute the error checking and correcting procedure for the read data according to the error checking and correcting code.

Figure 6:
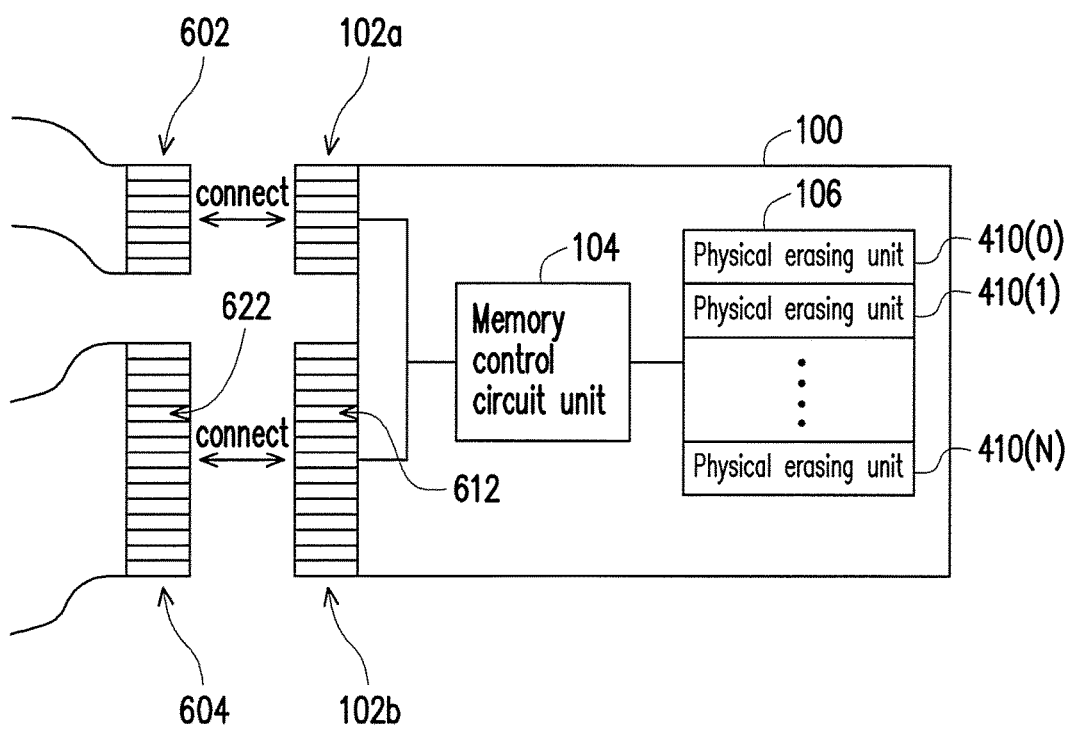
FIG. 6 is a schematic diagram illustrating an example of a bus connection interface and a power supply connection interface configured to connect the memory storage apparatus and the host system according to an exemplary embodiment.

FIG. 6 is a schematic diagram illustrating an example of a bus connection interface and a power supply connection interface configured to connect the memory storage apparatus and the host system according to an exemplary embodiment.

Referring to FIG. 6, a bus connection interface 602 is electrically connected to a control chip set (not illustrated) of the host system 1000, and configured to connect the data connection interface 102a of the memory storage apparatus 100. A power supply connection interface 604 is electrically connected to a power supply (not illustrated) of the host system 1000, and configured to connect to the power connection interface 102b of the memory storage apparatus 100.

As similar to the above, in the present exemplary embodiment, the power connection interface 102b includes a device sleep signal pin 612. When the power supply connection interface 604 is electrically connected to the power connection interface 102b, a signal output pin 622 of the power supply connection interface 604 is coupled to the device sleep signal pin 612. For instance, when the host system 1000 is power on, the signal output pin 622 outputs a voltage signal being 3.3V, which is configured to provide power required by the devices being coupled thereto.

As described above, if the signal output pin 622 electrically connected to the device sleep signal pin 612 supports the device sleep signal protocol, under the circumstance where the memory storage apparatus 100 operates normally, the host system 1000 controls the potential signal on the signal output pin 622 to be at the second logic level so that the potential signal on the device sleep signal pin 612 is also at the second logic level. Accordingly, the memory control circuit unit 104 (or the memory management circuit 202) may operate normally according to a state of the device sleep signal pin 612. Accordingly, if the host system 1000 supports the device sleep signal protocol, under such standard, the signal output pin 622 for connecting the device sleep signal pin 612 should be correctly electrically connected to corresponding pins in a chip set (not illustrated) of the host system 1000, so as to control the memory storage apparatus 100 to enter an operation mode or the sleep mode.

According to such standard, the potential signal received by the device sleep signal pin 612 is initially at the first logic level. If the signal output pin 622 does not support the device sleep signal protocol, the host system 1000 will not use the signal output pin 622 to output a device sleep control signal. In that case, after the host system 1000 is power on, because the potential signal on the signal output pin 622 is at the first logic level, the memory storage apparatus 100 directly enters the sleep mode due to misjudgments.

As described above, the potential signal received by the device sleep signal pin 612 is initially at the first logic level. In the present exemplary embodiment, the memory control circuit unit 104 (or the memory management circuit 202) identifies whether the signal output pin 622 supports the device sleep signal protocol according to changes in the logic level on the device sleep signal pin 612. Specifically, when the potential signal on the device sleep signal pin 612 changes from the initially set first logic level to the second logic level, the memory control circuit unit 104 (or the memory management circuit 202) receives an interrupt signal. At this time, the memory control circuit unit 104 (or the memory management circuit 202) determines whether a command (e.g., a SATA command) from the host system 1000 is received. If the command from the host system 1000 is not received, the memory control circuit unit 104 (or the memory management circuit 202) determines whether the potential signal on the device sleep signal pin 612 is at the second logic level. Particularly, if the potential signal on the device sleep signal pin 612 is at the second logic level, the memory control circuit unit 104 (or the memory management circuit 202) sets a sleep pin connecting flag as a first value. For example, the sleep pin connecting flag is stored in the buffering memory unit 208. The sleep pin connecting flag is initially set as a second value when the memory storage apparatus 100 is power on, and the sleep pin connecting flag is removed when the memory storage apparatus 100 is power off. In other words, after the memory storage apparatus 100 is power on, if the potential signal on the device sleep signal pin 612 changes from the initial set first logic level to the second logic level, the sleep pin connecting flag is set as the first value to indicate that the signal output pin 622 connected to the device sleep signal pin 612 is correctly electrically connected to the chip set of the host system 1000. Herein, the first value is set as "1" and the second value is set as "0." Nevertheless, it should be understood that the present invention is not limited thereto. The first value and the second value may be any two different values. For example, in another exemplary embodiment, it is also possible that the first value is set as "0" and the second value is set as "1."

In the case where the device sleep function flag is set as the first value, if a device sleep function enabling command is received after the device sleep function flag is set as the first value or already received before the device sleep function flag is set as the first value, the memory control circuit unit 104 (or the memory storage apparatus 202) enables a device sleep function of the memory storage apparatus 100.

Specifically, when the host system 1000 transmits the device sleep function enabling command to the memory storage apparatus 100 through the bus connection interface 602, the memory control circuit unit 104 (or the memory management circuit 202) sets the device sleep function flag as the first value. For example, the device sleep function flag is stored in the buffering memory unit 208. The device sleep function flag is initially set as the second value when the memory storage apparatus 100 is power on, and the device sleep function flag is removed when the memory storage apparatus 100 is power off.

Particularly, if the device sleep function flag is set as the first value and the sleep pin connecting flag is also set as the first value, the memory control circuit unit 104 (or the memory management circuit 202) enables the device sleep function. Further, when the host system 1000 instructs to enter the sleep mode through the signal output pin 622 connected to the device sleep signal pin 612 (e.g., by controlling the potential of the signal output pin 622 to change from the second logic level to the first logic level), the memory control circuit unit 104 (or the memory management circuit 202) enables the sleep mode, so that the memory storage apparatus 100 stops operating and enters a state of low power consumption. In other words, in the case where the device sleep function flag is set as the first value and the sleep pin connecting flag is also set as the first value, if the potential signal on the device sleep signal pin 612 at the first logic level is detected, the memory control circuit unit 104 (or the memory management circuit 202) enters the sleep mode. Furthermore, in the sleep mode, if the potential signal on the device sleep signal pin 612 at the second logic level is detected, the memory control circuit unit 104 (or the memory management circuit 202) restores from the sleep mode to the operation mode.

Figure 7A:
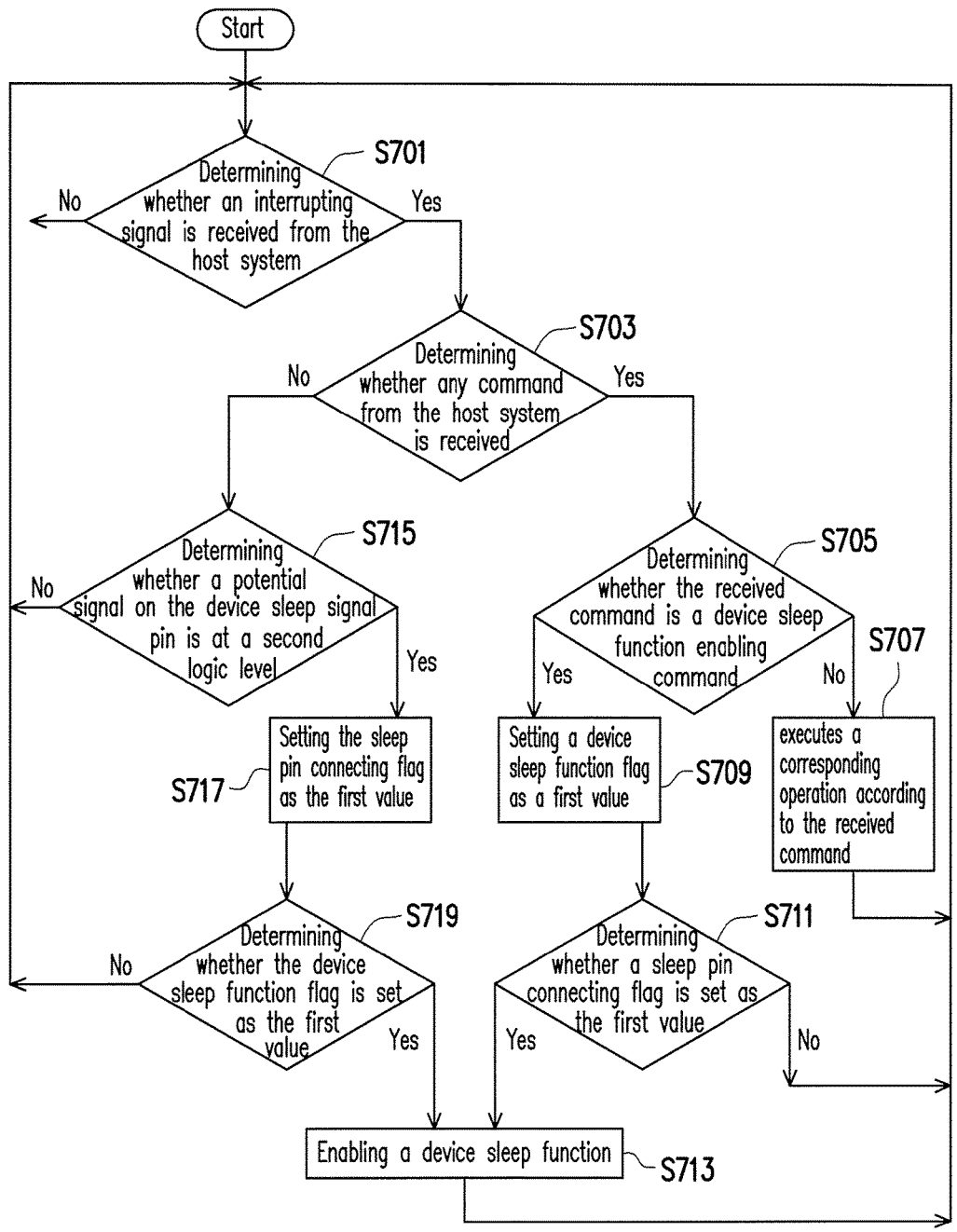
FIG. 7A and FIG. 7B are flowcharts illustrating a sleep mode enabling method according to an exemplary embodiment.
Figure 7B:
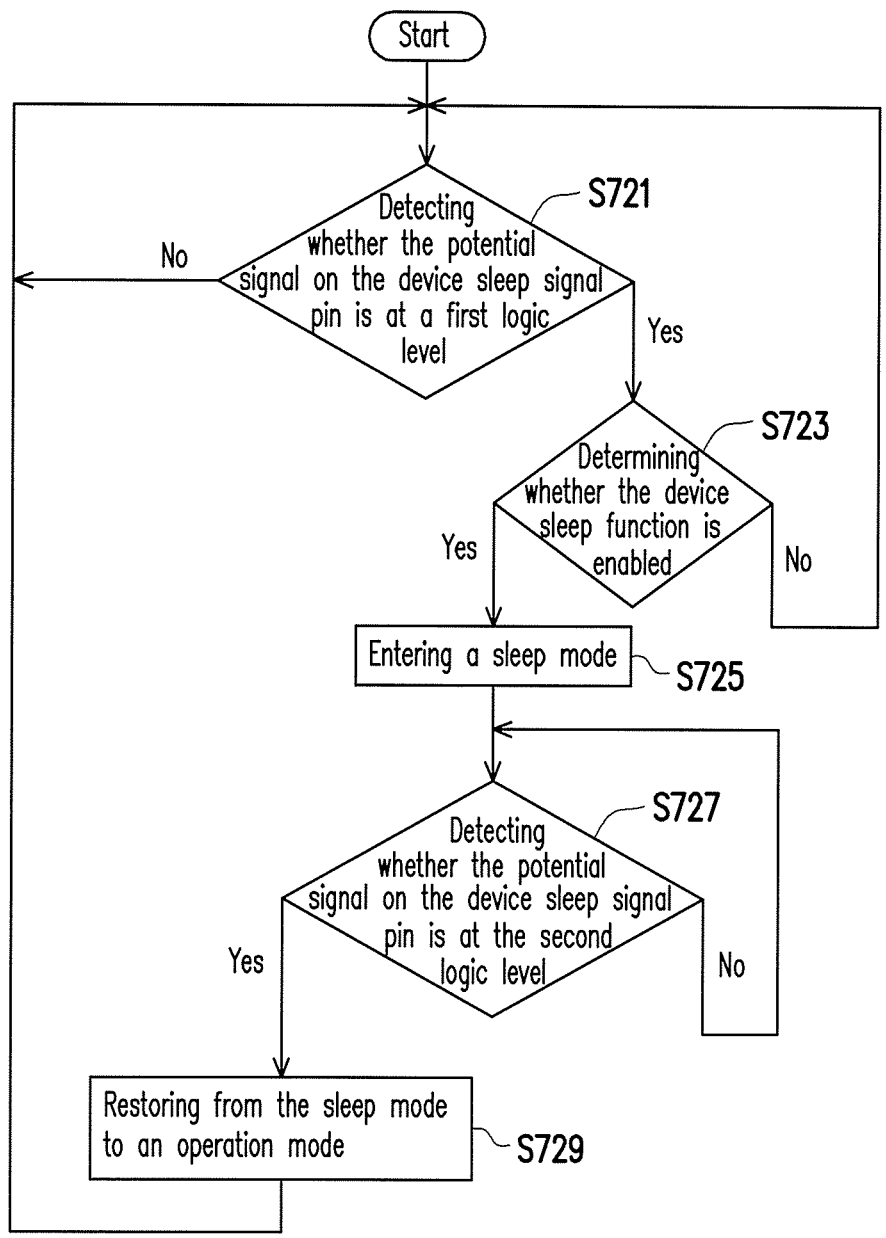

FIG. 7A and FIG. 7B are flowcharts illustrating a sleep mode enabling method according to an exemplary embodiment. In the present exemplary embodiment, the process of the FIG. 7A and FIG. 7B is executed when the memory storage apparatus 100 is power on, and the process of the FIG. 7A and FIG. 7B is terminated when the memory storage apparatus 100 is power off.

Referring to FIG. 7A, in step S701, the memory control circuit unit 104 (or the memory management circuit 202) determines whether an interrupting signal is received from the host system 1000. If the interrupting signal is received, in step S703, the memory control circuit unit 104 (or the memory management circuit 202) determines whether any command from the host system 1000 is received.

If a command is received from the host system 1000, in step S705, the memory control circuit unit 104 (or the memory management circuit 202) determines whether the received command is a device sleep function enabling command. If the received command is not the device sleep function enabling command, the memory control circuit unit 104 (or the memory management circuit 202) executes a corresponding operation (e.g., a writing operation, a reading operation, etc.) according to the received command in step S707. Then, step S701 is executed.

If the received command is the device sleep function enabling command, the memory control circuit unit 104 (or the memory management circuit 202) sets a device sleep function flag as a first value in step S709, and the memory control circuit unit 104 (or the memory management circuit 202) determines whether a sleep pin connecting flag is set as the first value in step S711. If the sleep pin connecting flag is not the first value, step S701 is executed.

If it is determined that the sleep pin connecting flag is also set as the first value in step S711, the memory control circuits unit 104 (or the memory management circuit 202) enables a device sleep function in step S713.

If it is determined that the command from the host system 1000 is not received in step S703, the memory control circuit unit 104 (or the memory management circuit 202) determines whether a potential signal on the device sleep signal pin 612 is at a second logic level in step S715. If the potential signal on the device sleep signal pin 612 is not at the second logic level, step S701 is executed.

If it is determined that the potential signal on the device sleep signal pin 612 is at the second logic level in step S715, the memory control circuit unit 104 (or the memory management circuit 202) sets the sleep pin connecting flag as the first value in step S717. Further, in step S719, the memory control circuit unit 104 (or the memory management circuit 202) determines whether the device sleep function flag is set as the first value.

If the device sleep function flag is not set as the first value, step S701 is executed; otherwise, if the device sleep function flag is set as the first value, step S713 is executed.

Referring to FIG. 7B, in step S721, the memory control circuit unit 104 (or the memory management circuit 202) detects whether the potential signal on the device sleep signal pin 612 is at a first logic level.

If the potential signal on the device sleep signal pin 612 is at the first logic level, the memory control circuit unit 104 (or the memory management circuit 202) determines whether the device sleep function is enabled in step S723. If the device sleep function is not enabled, step S721 is executed.

If the device sleep function is enabled, the memory control circuit unit 104 (or the memory management circuit 202) enters a sleep mode in step S725. Thereafter, in step, the memory control circuit unit 104 (or the memory management circuit 202) detects whether the potential signal on the device sleep signal pin 612 is at the second logic level in step S727. If the potential signal on the device sleep signal pin 612 is not at the second logic level, step S727 is executed.

If it is determined that the potential signal on the device sleep signal pin 612 is at the second logic level in step S727, the memory control circuit unit 104 (or the memory management circuit 202) restores from the sleep mode to an operation mode in step S729, and then step S721 is executed.

In summary, in the sleep mode enabling method, the memory control circuit unit and the memory storage apparatus according to the exemplary embodiments of the invention, the device sleep function flag is set as the corresponding value when the device sleep function enabling command is received and the sleep pin connecting flag is set as the corresponding value when the potential signal on the device sleep signal pin at the second logic level is detected. Further, the device sleep function may be enabled only when the device sleep function flag and the sleep pin connecting flag are both the corresponding value. When the sleep pin connecting flag is set as the corresponding value, it indicates that the potential signal on the device sleep signal pin of the memory storage apparatus already changes from the initially set first logic level to the second logic level. Therefore, whether the signal output pin connected the device sleep signal pin is correctly electrically connected to the ship set of the host system may be identified. Accordingly, the sleep mode enabling method, the memory control circuit unit and the memory storage apparatus according to the exemplary embodiments of the invention are capable of reasonably avoid the sleep mode from being enabled due to misjudgments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sleep mode enabling method for a memory storage apparatus, wherein a potential signal on a device sleep signal pin of the memory storage apparatus is initially at a first logic level, the sleep mode enabling method comprising:
   setting a sleep pin connecting flag as a first value if the potential signal on the device sleep signal pin of the memory storage apparatus is at a second logic level opposite to the first logic level;
   enabling a device sleep function of the memory storage apparatus if a device sleep function enabling command is received, the sleep pin connecting flag is set as the first value and the device sleep function flag is set as the first value, comprising:
      determining whether the sleep pin connecting flag is set as the first value after setting the device sleep function flag as the first value; and
      enabling the device sleep function of the memory storage apparatus if the sleep pin connecting flag is set as the first value; and
   setting the device sleep function flag as the first value in response to the device sleep function enabling command received from a host system.

2. The sleep mode enabling method of claim 1, further comprising:
   enabling the memory storage apparatus to enter a sleep mode when the device sleep function of the memory storage apparatus is enabled and the potential signal on the device sleep signal pin of the memory storage apparatus at the first logic level is detected.

3. The sleep mode enabling method of claim 2, further comprising:
   detecting whether the potential signal on the device sleep signal pin of the memory storage apparatus changes from the first logic level to the second logic level after the memory storage apparatus enters the sleep mode; and
   restoring the memory storage apparatus from the sleep mode to an operation mode if detecting that the potential signal on the device sleep signal pin of the memory storage apparatus changes from the first logic level to the second logic level.

4. The sleep mode enabling method of claim 2, wherein the step of enabling the memory storage apparatus to enter the sleep mode when the device sleep function of the memory storage apparatus is enabled and the potential signal on the device sleep signal pin of the memory storage apparatus at the first logic level is detected comprises:
   determining whether the potential signal on the device sleep signal pin of the memory storage apparatus is at the first logic level after enabling the device sleep function of the memory storage apparatus; and
   enabling the memory storage apparatus to enter the sleep mode if the potential signal on the device sleep signal pin of the memory storage apparatus is at the first logic level.

5. The sleep mode enabling method of claim 1, wherein the step of enabling the device sleep function of the memory storage apparatus when the sleep pin connecting flag is set as the first value and the device sleep function flag is set as the first value comprises:
   determining whether the device sleep function flag is set as the first value after setting the sleep pin connecting flag as the first value; and
   enabling the device sleep function of the memory storage apparatus if the device sleep function flag is set as the first value.

6. The sleep mode enabling method of claim 1, wherein the first logic level is a high logic level and the second logic level is a low logic level.

7. A memory control circuit unit for controlling a memory storage apparatus, wherein a potential signal on a device sleep signal pin of the memory storage apparatus is initially at a first logic level, the memory control circuit unit comprising:
   a host interface configured to electrically connect to a host system;
   a memory interface configured to couple to a rewritable non-volatile memory module;
   a buffer storage unit configured to record a sleep pin connecting flag; and
   a memory management circuit coupled to the memory interface, the host interface and the buffer storage unit,
   wherein the memory management circuit is configured to set the sleep pin connecting flag as a first value if the potential signal on the device sleep signal pin of the memory storage apparatus is at a second logic level opposite to the first logic level,
   wherein the memory management circuit is further configured to enable a device sleep function if a device sleep function enabling command is received, the sleep pin connecting flag is set as the first value and the device sleep function flag is set as the first value, wherein the memory management circuit determines whether the sleep pin connecting flag is set as the first value after setting the device sleep function flag as the first value, wherein the memory management circuit enables the device sleep function if the sleep pin connecting flag is set as the first value, wherein the memory management circuit is further configured to set the device sleep function flag as the first value in response to the device sleep function enabling command received from the host system through the host interface.

8. The memory control circuit unit of claim 7, wherein the buffer storage unit records the device sleep function flag.

9. The memory control circuit unit of claim 7,
wherein the memory management circuit is further configured to enter a sleep mode when the device sleep function is enabled and the potential signal on the device sleep signal pin of the memory storage apparatus at the first logic level is detected.

10. The memory control circuit unit of claim 9,
wherein the memory management circuit is further configured to detect whether the potential signal on the device sleep signal pin of the memory storage apparatus changes from the first logic level to the second logic level after the memory storage apparatus enters the sleep mode,
wherein the memory management circuit restores from the sleep mode to an operation mode if detecting that the potential signal on the device sleep signal pin of the memory storage apparatus changes from the first logic level to the second logic level.

11. The memory control circuit unit of claim 9, wherein in the operation of entering the sleep mode when the device sleep function is enabled and the potential signal on the device sleep signal pin of the memory storage apparatus at the first logic level is detected, the memory management circuit determines whether the potential signal on the device sleep signal pin of the memory storage apparatus is at the first logic level after enabling the device sleep function of the memory storage apparatus,
the memory management circuit enters the sleep mode if the potential signal on the device sleep signal pin of the memory storage apparatus is at the first logic level.

12. The memory control circuit unit of claim 7, wherein in the operation of enabling the device sleep function when the sleep pin connecting flag is set as the first value and the device sleep function flag is set as the first value, the memory management circuit determines whether the device sleep function flag is set as the first value after setting the sleep pin connecting flag as the first value,
wherein the memory management circuit enables the device sleep function if the device sleep function flag is set as the first value.

13. The memory control circuit unit of claim 7, wherein the first logic level is a high logic level and the second logic level is a low logic level.

14. A memory storage apparatus, comprising:
a connection interface unit configured to couple to a host system, the connection interface unit comprising a data connection interface and a power connection interface;
a rewritable non-volatile memory module having a plurality of physical erasing units; and
a memory control circuit unit coupled to the connection interface unit and the rewritable non-volatile memory module, wherein the memory control circuit unit comprises a buffer storage unit, wherein the buffer storage unit records a sleep pin connecting flag,
wherein the memory control circuit unit is configured to set the sleep pin connecting flag as a first value if the potential signal on a device sleep signal pin is at a second logic level opposite to a first logic level,
wherein the memory control circuit unit enables a device sleep function if a device sleep function enabling command is received, the sleep pin connecting flag is set as the first value and the device sleep function flag is set as the first value, wherein the memory control circuit unit determines whether the sleep pin connecting flag is set as the first value after setting the device sleep function flag as the first value, wherein the memory control circuit unit enables the device sleep function if the sleep pin connecting flag is set as the first value,
wherein the memory control circuit unit is further configured to set the device sleep function flag as the first value in response to the device sleep function enabling command received from the host system through the host interface.

15. The memory storage apparatus of claim 14, wherein the buffer storage unit records the device sleep function flag.

16. The memory storage apparatus of claim 14,
wherein the memory control circuit unit is further configured to enter a sleep mode when the device sleep function is enabled and the potential signal on the device sleep signal pin of the memory storage apparatus at the first logic level is detected.

17. The memory storage apparatus of claim 16,
wherein the memory control circuit unit is further configured to detect whether the potential signal on the device sleep signal pin changes from the first logic level to the second logic level after entering the sleep mode,
wherein memory control circuit unit restores from the sleep mode to an operation mode if detecting that the potential signal on the device sleep signal pin changes from the first logic level to the second logic level.

18. The memory storage apparatus of claim 16, wherein in the operation of entering the sleep mode when the device sleep function is enabled and the potential signal on the device sleep signal pin at the first logic level is detected, the memory control circuit unit determines whether the potential signal on the device sleep signal pin of the memory storage apparatus is at the first logic level after enabling the device sleep function, and
the memory control circuit unit enters the sleep mode if the potential signal on the device sleep signal pin is at the first logic level.

19. The memory storage apparatus of claim 14, wherein in the operation of enabling the device sleep function when the sleep pin connecting flag is set as the first value and the device sleep function flag is set as the first value, the memory control circuit unit determines whether the device sleep function flag is set as the first value after setting the sleep pin connecting flag as the first value,
wherein the memory control circuit unit enables the device sleep function if the device sleep function flag is set as the first value.

20. The memory storage apparatus of claim 14, wherein the first logic level is a high logic level and the second logic level is a low logic level.

21. The memory storage apparatus of claim 14, wherein the device sleep signal pin is disposed on the power connection interface, and the power connection interface is a serial advanced technology attachment power connection interface and the data connection interface is a serial advanced technology attachment connection interface.

* * * * *